(12) United States Patent
Stocker

(10) Patent No.: US 8,890,927 B2
(45) Date of Patent: Nov. 18, 2014

(54) VISUAL TELEPHONY APPARATUS, SYSTEM AND METHOD

(76) Inventor: Loren Stocker, Del Mar, CA (US)

(*) Notice: Subject to any disclaimer, the term of this patent is extended or adjusted under 35 U.S.C. 154(b) by 297 days.

(21) Appl. No.: 13/506,234

(22) Filed: Apr. 4, 2012

(65) Prior Publication Data

US 2012/0257002 A1    Oct. 11, 2012

Related U.S. Application Data

(60) Provisional application No. 61/516,664, filed on Apr. 5, 2011.

(51) Int. Cl.
| | | |
|---|---|---|
| *H04N 7/15* | (2006.01) | |
| *H04M 7/00* | (2006.01) | |
| *H04M 3/42* | (2006.01) | |
| *H04M 3/56* | (2006.01) | |

(52) U.S. Cl.
CPC ........ *H04M 7/0024* (2013.01); *H04M 3/42093* (2013.01); *H04M 3/567* (2013.01); *H04M 3/42042* (2013.01)
USPC .......... 348/14.08; 348/552; 370/353; 379/52; 379/88.17; 379/93.25; 382/113; 709/225; 715/716

(58) Field of Classification Search
CPC ..... H04N 19/00909; H04M 3/56; H04M 7/00
USPC ........... 348/14.08, 552; 379/52, 88.17, 93.25; 370/353; 382/113; 709/225; 715/716
See application file for complete search history.

(56) References Cited

U.S. PATENT DOCUMENTS

| | | | |
|---|---|---|---|
| 3,877,143 A | 4/1975 | Montesi | |
| 4,711,029 A | 12/1987 | Somerset | |
| 5,014,434 A | 5/1991 | Sherker et al. | |
| 5,852,657 A * | 12/1998 | Malik et al. | 379/93.25 |
| 6,560,320 B1 | 5/2003 | Paleiov et al. | |
| 6,606,384 B1 | 8/2003 | Kruse et al. | |
| 6,621,502 B1 * | 9/2003 | Nair et al. | 715/716 |
| 6,724,918 B1 * | 4/2004 | Yen et al. | 382/113 |
| 7,127,841 B1 | 10/2006 | Weber | |
| 7,441,031 B2 * | 10/2008 | Shrinivasan et al. | 709/225 |
| 7,634,067 B1 * | 12/2009 | Velarde et al. | 379/88.17 |
| 7,769,141 B2 * | 8/2010 | Cupal et al. | 379/52 |
| 8,036,355 B2 | 10/2011 | Velarde et al. | |
| 8,675,642 B2 * | 3/2014 | Rosenberg et al. | 370/353 |
| 2004/0121814 A1 | 6/2004 | Creamer et al. | |

(Continued)

FOREIGN PATENT DOCUMENTS

RU    70020 U1    1/2008

OTHER PUBLICATIONS

International Search Report and Written Opinion of the International Searching Authority of PCT/US2012/000190.

*Primary Examiner* — Gerald Gauthier

(57) ABSTRACT

A visual telephony apparatus, system and method are provided. In one embodiment, the visual telephony method includes a method implemented using a processor, the method including the steps of: detecting at least one telephony attribute associated with a voice call directed from a voice communication device to a publicly switched telephone network number; identifying a visual content that has been preassociated with the at least one telephony attribute; initiating a request for the visual content in response to the detecting step; and receiving the visual content in response to the initiating step, the visual content being received at a display device.

18 Claims, 8 Drawing Sheets

(56) References Cited

U.S. PATENT DOCUMENTS

| | | |
|---|---|---|
| 2007/0135101 A1 | 6/2007 | Ramati et al. |
| 2008/0091536 A1 | 4/2008 | Wolmuth |
| 2009/0121062 A1 | 5/2009 | Silver et al. |
| 2009/0154666 A1 | 6/2009 | Rios et al. |
| 2010/0014648 A1 | 1/2010 | Baglio et al. |
| 2010/0191608 A1 | 7/2010 | Mikkelsen et al. |
| 2010/0255890 A1 | 10/2010 | Mikkelsen et al. |
| 2011/0085082 A1* | 4/2011 | Jing et al. ............... 348/552 |
| 2012/0257002 A1* | 10/2012 | Stocker ............... 348/14.08 |

* cited by examiner

VISUAL TELEPHONY APPARATUS, SYSTEM AND METHOD

Priority is claimed to provisional application Ser. No. 61/516,664, filed Apr. 5, 2011, entitled: "Visual Voice Call Apparatus, System and Method," which is referred to and incorporated herein in its entirety by this reference.

FIELD OF THE INVENTION

The present invention generally relates to communication systems. More particularly, the invention concerns a system, method and apparatus to enable access to visual information over the Public Switch Telephone Network.

BACKGROUND OF THE INVENTION

Within two years of the 1876 invention of telephone, a personal video phone known as a "telephonoscope" was conceptualized and popularized in the press. Such a device, it was asserted, would allow merchants to transmit pictures of their wares to customers in distant cities.

Alexander Graham Bell himself went on to predict that: " . . . the day would come when the man at the telephone would be able to see the distant person to whom he was speaking." Yet, for most of us, visual telephony is far from an everyday experience some 130 years later.

The technology emerged by the 1920's that allowed television to be deployed. Inspired by radio and constrained by cost, television emerged as the one-to-many broadcast system we know today.

Video conferencing systems are now available as IP-based systems but have mostly been displaced by Internet meeting services like Cisco WebEx, GoToMeeting, and Fuze Meeting. Video services like Skype, Facetime, and other visual services have been deployed to provide visual interaction and/or desktop sharing on a one-to-many and one-to-one basis.

All of these services bypass the Public Switched Telephone Network (PSTN) as they are initiated and conducted by means of the IP-based network. Sessions are initiated either by entering an Internet address, clicking a link, or by the use of a proxy that connects two users from point to point over IP-based network.

Most telephone applications are limited to voice and touch-tone telephony communications. When dynamic, interactive visual content is desired in real time, consumers use the Internet, where visual information is robust but neither synchronized to the automated telephone application nor visible to a sales agent.

A typical sales inquiry typically includes a phone call where the agent verbally instructs the hapless consumer to click to the relevant section of the merchants website to "see" the product and features being discussed. Or, if the voice call is initiated by the consumer, the consumer is left to describe where they are in the merchant's website so the agent may catch up and follow along. Either approach may become a frustrating experience Therefore, there remains a need to overcome one or more of the limitations in the above-described, existing art. The discussion of the background to the invention included herein is included to explain the context of the invention. This is not to be taken as an admission that any of the material referred to was published, known or part of the common general knowledge as at the priority date of the claims.

DETAILED DESCRIPTION OF THE PREFERRED EMBODIMENTS

Figure 1:
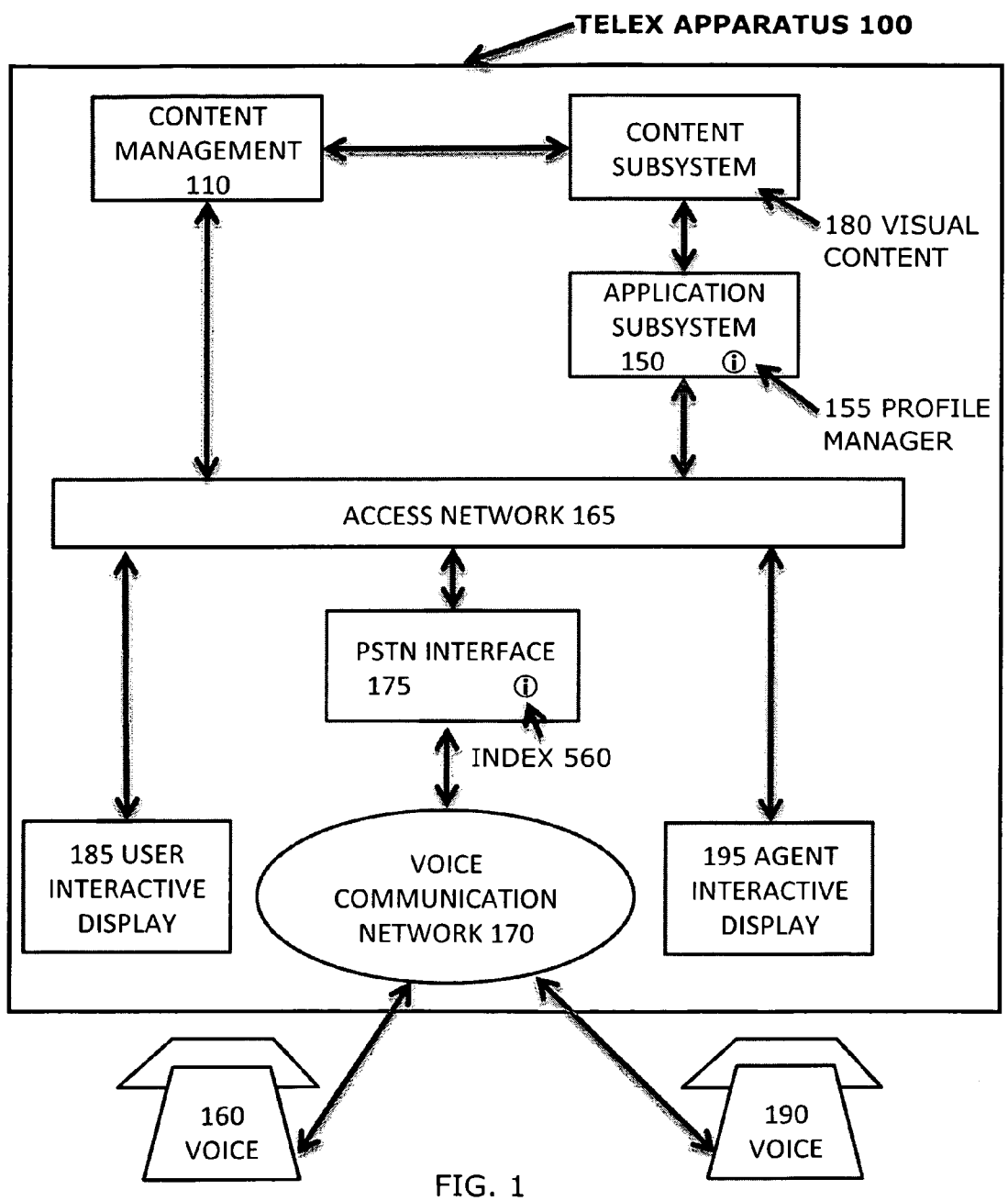
FIG. 1 is a block diagram illustrating an exemplary visual telephony apparatus, according to an embodiment of the present invention.

In the following description, for the purposes of explanation, numerous specific details are set forth in order to provide a thorough understanding of the Telex Apparatus 100 of the present invention. It will be apparent, however, to one skilled in the art that the Telex Apparatus 100 may be practiced without some of these specific details. Throughout this description, the embodiments and examples shown should be considered as exemplars, rather than as limitations on the Telex Apparatus 100. That is, the following description provides examples, and the accompanying drawings show various examples for the purposes of illustration. However, these examples should not be construed in a limiting sense as they are merely intended to provide examples of the Telex Apparatus 100 rather than to provide an exhaustive list of all possible implementations of the Telex Apparatus 100.

In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Video phone in its basic form first became a reality in prewar Germany, but was quickly shelved due to the conflict. AT&T deployed its one-to-one "Picturephone" in the 1960's and again in the 1990's, but the high cost and requirement that both parties use specialized equipment hampered adoption.

Business-grade video conferencing became available in the 1980's over the Public Switched Telephone Network (PSTN), but required specialized equipment and high cost T-1 or ISDN connections at both ends. The PSTN has mostly been used to connect callers with human operators and to IVR systems, where callers are often frustrated by long waits associate with the serial presentation of audio selections.

Yet, the consistent reliably of a voice call and convenience of the PSTN dial-pad access endures. Most merchants promote both their Internet address to visually connect with their content servers (i.e. website), and their phone number to voice connect with a human operator over the PSTN.

In addition, merchants often present phone numbers on their websites and/or direct voice callers to the website address in their introductory announcements. For example, callers to Southwest Airlines will be greeted with the message "Lower fares may be found at Southwest.com." Current integration takes the form of an Internet chat session or click-to-call button, where consumers are connected by voice via a VoIP session or can initiate a call back over the PSTN.

The PSTN is slated to become IP-based and, with that, visual telephony services like video conferencing and content sharing will become inherent in the IP platform. Indeed, in late 2011 the FCC held its first workshop to explore this topic entitled the "The Public Switched Telephone Network (PSTN) in Transition."

Yet, concerns over public safety, disability access, and rural access will slow the transition to an IP-based phone system, and there is currently no clear path forward. In the interim, a hybrid visual telephony system is a way to tightly integrate both the high reliability of the PSTN and the visual nature of IP-based systems.

Verizon Data Services, LLC., conceived the first method of hybrid visual telephony where a "smart client" automatically detects, queries, and sends requests for specific, predefined visual content from a content server based on the dialed number, when available (hereafter known as the "Verizon Method," and further described in U.S. Pat. No. 8,036,355). For example, if a customer dialed 555-555-1111 and that number had predefined visual content for ABC-Pizza, a menu might automatically be presented to the caller.

This is a vast improvement over web-based services, as the caller need only dial a single phone number and the exact, predefined visual content appears on their display automatically, without a "click" of a mouse to initiate the request or the uncertainty introduced by search engines, which leave the users to decide which visual content is authoritative.

The Verizon Method works with any phone number, local or toll-free, because the dialed number with predefined visual content is detected by the client communication system, prior to calls entering the PSTN. This method and system requires the above-mentioned "smart client" to include specialized equipment like the IP-based Verizon One phone, a digital phone that includes an integrated Verizon FIOS system, or some other digital client (VERIZON is a registered trademark of Verizon Trademark Services LLC, Arlington, Va.)

The specialized equipment required by the Verizon Method comprises an "client communication device" that detects the dialed number as its dialed, sends that telephony identifier over an IP network to query a remote, off-premise database, and then receives and displays available visual content. If it has enough memory, the smart client may also host an index with visual content to hasten the display on the introductory page.

The above-described specialized equipment required by the Verizon Method is required because voice calls are switched from the caller's network to the destination network on a peer-to-peer basis, so calls to local numbers (i.e., 555-555-1111) may each take a unique route through the voice communications system (PSTN), making network detection of telephony identifiers elusive. Further, there is no way to ensure the availability and accuracy of the callers' identity (e.g. Caller ID) because of the privacy protection built into all local toll, or pay numbers.

In contrast to the Verizon Method, the present visual telephony invention Telex apparatus 100, described herein and illustrated in FIGS. 1-8, detection of a dialed number with pre-defined content may be done at the access network 165 level, after the voice call has left the client's premise or device and connected with the PSTN. This allows all phones, even legacy rotary-dial phones, to initiate a visual telephony session without specialized on-premise phone equipment or a detection box dedicated to each client.

To enable access network 165 detection, user profiles are maintained in a database and the callers identity is preserved within the access network 165 for the purpose of independently associating voice callers with their interactive displays as well as for privacy setting, content viewing preferences, content storage, and to facilitate payments and private information sharing and any other relevant user specifications or requirements.

In one embodiment, a visual telephony session is initiated by calling a hosted toll-free number (i.e., 800-555-1111). As defined herein, a toll-free number, also known as an 800, 0800 or 1-800 number is a special telephone number which is free to the calling party, and instead the telephone carrier charges the called party the cost of the call. A toll-free number is assigned from a special dialing prefix range (also known as area code) such as 1-800, but may also include 1-888, 1-877 or other designated area codes. "Hosted" toll-free means that the carrier responsible for the number also has a Telex PSTN interface 175 installed in their network.

Toll free numbers have two unique features that permit voice network 170 detection that local numbers do not. First, toll-free callers don't enjoy the same privacy protection as when merchants pay toll, so the automatic number identification (ANI) and dialed number identification service (DNIS) is preserved beyond the initial carrier connection, even if the caller selects Call ID blocking. Second, the nature of toll-free billing requires that telephony identifiers are available for detection by the called party and/or the carrier that hosts the toll-free service, regardless of the unique route that the calls may take through the voice communications network. Local number and toll-free number hosted by others do no have these two features.

These unique toll-free features, together with the use of a profile manager 155 within Telex System 100, as shown in FIG. 1, permit detection of the caller and any dialed numbers with pre-defined content to take place at the voice communication network 170 level, by a shared PSTN Interface 175 deployed in the telephone switch, by an interactive voice response (IVR) application, or in some other off-premise application known to those skilled in the art. Voice calls route through the existing PSTN in the usual fashion, also known to those skilled in the art.

The present invention may also be deployed using local numbers where a shared PSTN Interface 175 device is deployed in the switch network where ANI and DNIS are preserved by the hosting carrier. In either deployment, the detection is done in the voice communication network 170 level by a detection device shared by multiple clients, thus allowing consumers to enjoy robust, substantially synchronized visual content and interaction without purchasing any new devices or equipment. A plain old telephone service (POTS) line and any IP-connected display device, such as a computer, tablet, television, set-top box, auto dashboard viewer, with or without interactive capabilities, is all that's required of the client.

Preferred embodiments according to the present invention Telex apparatus 100 may be implemented as an apparatus, system, or method for creating Visual Telephony, i.e. visual content display and interaction in response to a voice call. Information and service providers that desire to provide visual content to callers may use the Telex apparatus 100 to create a substantially real-time visual experience.

Providers of information and services (referred to herein as "content providers") can use the present systems and methods to manage visual content, including building visual content and associating one or more telephony identifiers (e.g., voice network identifiers such as telephone numbers) and/or events with the visual content. A content management 110 system provides content providers with tools for managing visual content. The tools allow content providers to conveniently provide customized visual content and to define telephony identifiers and events, the occurrence of which will cause the visual content to be presented for consideration by users of voice communication services. Accordingly, display of visual content can be synchronized with telephony signals.

For example, users may initiate a toll-free voice call over a voice communication network to a target voice network identifier (e.g., a telephone number), which has been predefined as being associated with visual content. The present systems and methods can recognize the occurrence of telephony signals representative of the target telephone number, identify the visual content predefined as being associated with the target telephone number, and push the associated visual content to any convenient IP-based interactive display available to the caller. In this manner, users may be presented with visual content upon initiation of a voice call directed to a target telephone number, one associated with predefined visual content, and view said content in substantially real time, or at their convenience.

Because the caller can interact with the visual content at her own speed, the user no longer has to wait for a human or automated telephone operator to audibly recite menu options or other information before making a selection. Accordingly, the presentation of visual content to users of voice communication services generally enhances the convenience of accessing information and services through voice communication services. In addition, the present systems and methods provide content providers with substantial control over visual content, as well as the presentation of the visual content.

Turning now to the figures, FIG. 1 is a block diagram of an exemplary visual voice call system Telex apparatus 100, according to an embodiment. As shown in FIG. 1, Telex apparatus 100 may include content management subsystem 110, content subsystem 130, application subsystem 150, PSTN Interface 175, and user interactive display 185 and agent interactive display 195 communicatively coupled to one another as represented by the arrow lines shown in the Figure. Any voice communication devices 160 and/or 190 may be used, including a POTS line, to send and receive voice communications (e.g., voice calls) over voice communication network 170, as shown in FIG. 1. Visual content 180 may be deployed at content subsystem 130 for delivery to user interactive display 185 and/or an agent interactive display 195 once these displays are associated with a user and/or an agent by the profile manager 155, or index 560.

In response to a voice call from the voice communication device 160 and/or 190, placed on a voice communication network 170, the Telex apparatus 100 detects the telephony identifiers at PSTN interface 175 in the network and communicates those telephony identifiers (e.g., voice network identifiers such telephone numbers, network address, or any other attributes that identifies the caller, the callers location, and/or called number) to the application subsystem 150.

Relevant predefined dynamic visual content, or the necessary attributes to retrieve or create content, associated with the telephony attributes is identified and the visual content 180 may be deployed at content subsystem 130 for delivery to and display at one or more of the callers interactive displays 185 and/or an agents interactive displays 195, including an integrated communication device, a computer, cell phone, set-top box, TV, tablet PC, auto dashboard display, monitor or other IP-connected device capable of displaying visual content.

The Telex Apparatus 100 and/or interactive display 185 and/or an agents interactive display 195 device may restrict certain content for cause, such as safety or other reasons. For example, content in a dashboard display of a car may be restricted to slow changing pictures while the caller is driving. For other content, the display may be restricted to adults known to be over 18 years of age.

Content is stored in the content subsystem 130 or elsewhere and associated with one or more telephony identifiers and/or events (e.g. touch-tone signals), so that appropriate content may be displayed and substantially synchronized with the audio presentation (e.g. IVR scripting) or live operator assistance. Content may be predefined, or created dynamically using the necessary attributes to retrieve or create content known to those skilled in the art. Examples of visual content 180 will be described further below.

The voice communication network 170 may include any network capable of carrying voice communications between voice-enabled devices. For example, a voice communication network is typically configured to carry voice communications between devices, including mobile telephone services, and VoIP services. A voice communication network 170 may employ any voice service communication technologies known to those skilled in the art.

The telephony identifiers are detected at the network level by a shared PSTN Interface 175 deployed in the telephone switch, IVR application, or in some other off-premise application known to those skilled in the art and communicated to the application subsystem 150. The Telex apparatus 100 may use telephony identifiers and/or events to associate predefined visual content with the caller and the caller's location, and retrieves or creates a dynamic visual representation of the audio script (e.g. press "1" for sales, "2" for customer service, etc.) or other audio representations known to those skilled in the art. The Telex apparatus 100 and/or the other device may record the callers and/or agents session for later review. Callers may preregister or register as they call so they are known to the Telex apparatus 100.

The Telex apparatus 100 further holds, retrieves, and facilitates payments, information sharing, and session information that may be sent or shared either automatically or on a flexible permission basis. This allows callers to make a voice or visual selection that will cause payments, information or session information to be communicated to the called party and, with that, the parties may then engage in commerce as well as multi-party video and screen sharing, interaction, and control.

For example, the user of a voice communication device 160 and/or 190 may place a call to a local, toll free, or some other network address that has predefined dynamic, visual content over the voice communication network and that content will automatically be sent to one or more display devices associated with the user, including but not limited to the voice communication device itself (e.g., a telephone having display capabilities).

In a further example, the voice communication network might require the caller to select from several locations or departments, i.e. "1 for New York, 2 for Chicago, 3 for LA," or "1 for Sales, 2 for Service, 3 for Billing." These selections and their alpha-numeric descriptions may be sent to the Telex apparatus 100, which may format and push visual content to represent these choices dynamically along with or without predefined content, or push the essential instructions to the display device that has capability to create a visual representation of these selections.

The user of the voice communication device is presented dynamic, visual content in one or more displays and may immediately begin viewing, browsing, navigating content and fill manually or auto-fill information and make payments manually or programmatically without waiting for a human operator, an automated telephone application to audibly recite menu options, or even for the phone to be answered.

As the caller interacts with the dynamic, visual content and the audio menu options, the session interaction is recorded. If the called party's agent answers the phone, the agent may see previous interactions and, possibly, if flexible permissions are granted, may interact with the caller on a multiparty video using screen sharing. The Telex apparatus 100 may facilitate others to join the session by permission of the caller and/or called party. The caller and/or agent may share stored and/or retrieved information and make payments with flexible permissions.

This greatly increases the convenience and efficiency in which callers may access information and services. Further, they may immediately make menu choices visually, at their own pace, rather than wait for the audio script. The audio script follows the caller's directive substantially in real time as selections are sent back through the Telex apparatus 100 to the voice network. Once connected, the caller and called party may engage in a robust, visual and audio interaction automatically with flexible permissions.

In addition, the Telex apparatus 100 provides content providers with substantial control over the customer experience. The content management system 110 of the Telex apparatus 100 provides content designers with tools for managing and synchronizing visual content with telephony identifiers and events, such as IVR system scripts, touch tones, voice commands or other events known to those skilled in the art.

The Telex apparatus 100 provides access to all available content so that callers, and prospective callers, may both retrieve content that is associated with previous calls and/or search for content of interest in a directory format that may contain advertisement. Private content and member data may also be included but may only be searchable and/or viewable with permission that may be tailored generally, by group, or on a per-user basis.

Calls may be made both in advance of content delivery and while viewing the content on any display system that provides such functionality (a computer, cell phone and any other device having a visual display), either by dialing the associated telephony identifier or in response to a visual selection. Call backs may also be made when the voice-enabled device cannot be programmed to reconnect (POTS line for example).

For example, referring to FIG. 1, a caller initiates a toll-free voice call with any voice communication device 160 and/or 190 including a POTS phone and content will appear on any display device associated with the caller, or as directed by the caller, i.e. interactive visual displays 185 and/or 195. The caller may associate their displays and their communication devices in the Telex apparatus 100 prior to or after using the visual telephony system, unless they are calling from a system (smart phone, computer, or any and all combination of devices for both calling and display) having display capabilities, which may be programmed to register as they call.

Once a caller is known to the Telex apparatus 100, content will be sent to associated display devices, or any display associated by the caller. The caller need only log-in to the Telex apparatus 100 to associate a new display device. For example, a user may log into the Telex apparatus 100 on her home computer. Whenever she makes a toll-free call on her POTS to a number with predefined content, it will be pushed into her home computer as a display device. Alternately, when calling from a phone with an integrated display, pre-defined content may be pushed into the phone's display. The caller may interact with visual dynamic content if the display device includes a way to respond, i.e. mouse, track pad, touch screen or any other method known to those skilled in the art.

A toll-free call is placed using any telephony device, i.e. voice communication devices, 160 and/or 190. As the call passes through the voice communication network (e.g. switch, IVR, or some other network element known to those skilled in the art), one or more telephony identifiers are detected by PSTN interface 175 and sent to the application server 150 in substantially real time. The call is processed through its usual channels.

The Telex apparatus 100 uses telephony identifiers to identify both the caller and predefined content associated with the called party, and delivers that content to the callers active displays or, if the caller has no displays active at the time, either pushes or makes available that content to the caller on their next display activation. In addition, the Telex apparatus 100 logs each content download and hosts a directory of available content so callers may retrieve any previously delivered content on demand, as well as download any available predefined content even before making a call.

The caller is free to view, browse, and navigate content while the phone call is routed to the desired agent of the called party. In one preferred implementation, one or more agents of the called party may join the caller's visual session upon answering the phone as well as interact with the caller, each other, or added parties by multiparty video.

For example, a caller may want their spouse to view an item being considered for purchase. The spouse may call from a predefined phone number from their home or office and be added to the multi-party video by voice and their per-associated desktop display will join the IP video session in progress.

In another embodiment, the caller's session information is held in the Telex apparatus 100, or obtained by the Telex apparatus 100 as proxy for the call center 120 (shown in FIG. 2) or a $3^{rd}$ party multiparty video service, and a query by an agent allows the called party to create a joint viewing session of the caller's display and to connect by video. For example, an agent using the callers ANI (caller's number), DNIS (called number), or other telephony identifiers may query the Telex Apparatus 100 and connect visually with the caller.

Further, this session information allows the called party to transfer from agent to agent, or any other concurrent caller, with each party joining the visual session or may hang up and reconnect into the session as often as desired. The caller may reengage with the calling party either by redialing or visual selection. The caller and called party may rejoin the session at any time.

When connected, either the caller, called party, or joined party may share additional visual content and interact, such as by pointer, whiteboard, and other tools known to those skilled in the art, beyond the predefined content sent and/or created prior to the multiparty session.

Permission and session controls are flexible and predefined for the type of call desired, and permissions and controls may be granted by the caller or called party. Permission controls include, but are not limited to, voice, interactive content, video viewing, interconnection, and display video. In one embodiment of the Telex apparatus 100, these permission controls may be known by the acronym VIVID, where V=Voice, I=Interactive Content, V=Video (initiating party), I=Interconnect (i.e. join session), and D=Display Video (granting party).

For example, when applied to a toll-free call to a sales agent, upon calling, the caller's permissions may default to Voice and Interaction (VI---). Once answered, the agents Video (VIV--) may be visible to the caller. The caller may grant permission to Interconnect, i.e. for the agent to join the visual session and to Display their video or photo image to the agent (a fully VIVID session). The caller may select V---- to reconnect with the agent, once voice call has ended.

In another embodiment, a company may permit the public to see visual content upon dialing, but may want to screen the caller before they Inter-connect or Display their own video and/or images. In yet another application, a company may wish to screen or bill the caller by voice, or visual means, before they grant permission to see any additional visual content. Permission controls are intended to be completely flexible and pre-definable.

Information and payments may be made or facilitated on the visual display. By granting permission, manually or automatically, information may be filled into forms and payments made from account information that is either stored in the Telex apparatus 100, the voice enabled device, or from some other network location.

Upon hang up, the content and capabilities endure in the caller's visual display or, if the caller was unable to view the content during the call, the content is available upon log-in once the caller gets to a visual display. For example, if a call was made while driving the caller may have been restricted from certain content such a video, which may be viewed at a later time. The caller may reengage with the called party by voice either by redialing or visual selection. The caller and called party may rejoin the visual session at any time.

Figure 2:
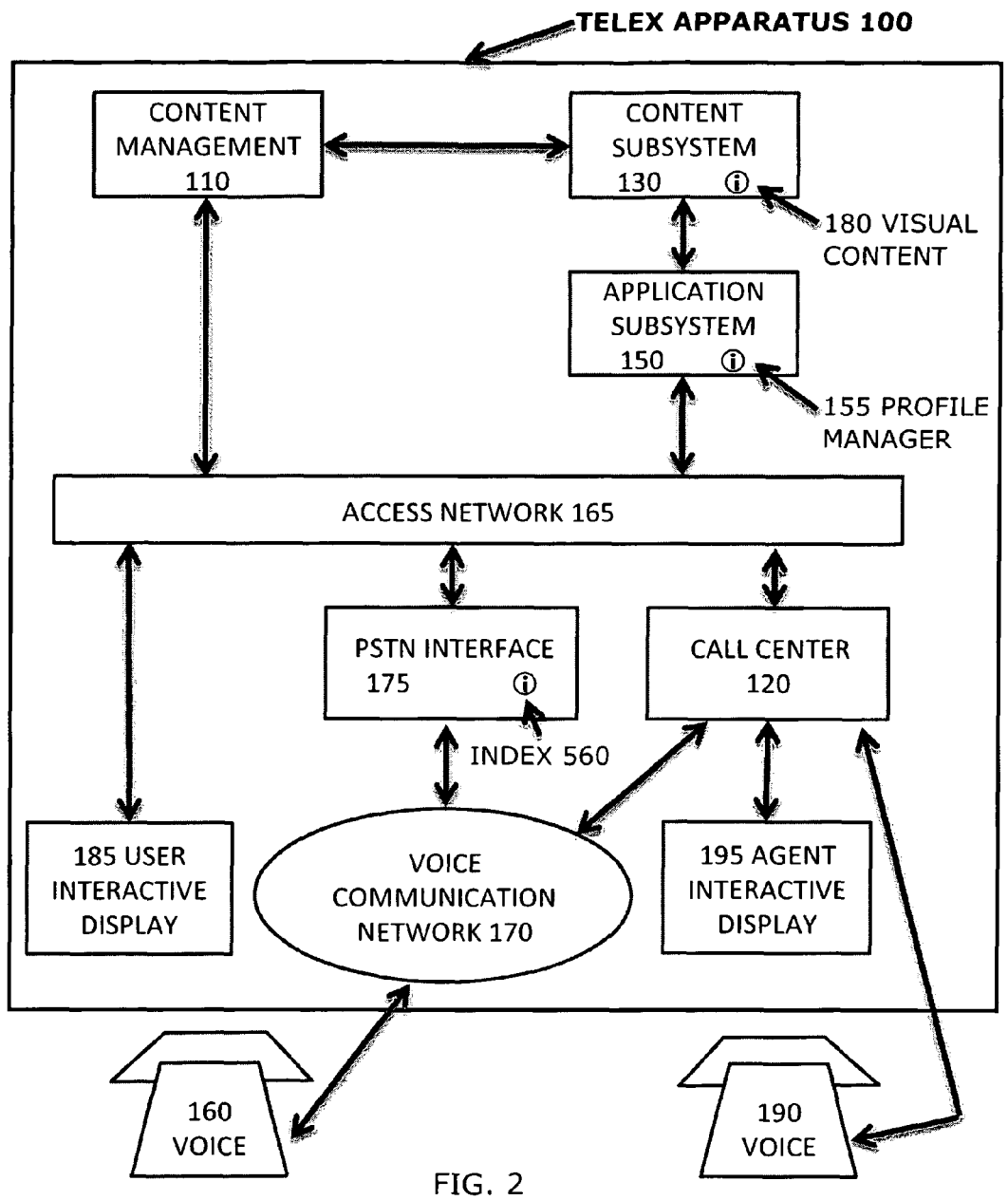
FIG. 2 is a block diagram illustrating an exemplary visual telephony apparatus, according to an embodiment that includes a call center.

Referring now to FIG. 2, the call center 120 comprises a called parties call center, or other application that provides access to an agent representing the called party. For example, call center 120 may be as simple as phone line direct to an agent, or as robust as a multi-party video system with a call center 120 distributing calls to numerous agents anywhere in the world.

Turning again to FIGS. 1-2, content management system 110 may include one or more computing devices (e.g., servers and/or client devices) and computer-readable instructions (e.g., software) configured to be executed on the device(s). In certain embodiments, content management system 110 includes one or more servers (e.g., web servers and application servers) configured to make content management tools available to content providers through one or more communication networks. For example, content management system 110 may make web services for managing content available to a user via the Internet. Content management system 110 may include one or more interfaces through which content providers can access the content management tools. Accordingly, a content provider may use any suitable computing device(s) and application(s) (e.g., a web browser) (not shown in FIGS. 1-2) to access the tools provided by content management system 110.

Suitable devices for accessing content management system 110 may include, but are not limited to, one or more desktop computers, laptop computers, tablet computers, handheld devices, personal data assistants, mobile telephones (e.g. cellular telephones), IP-enabled devices, satellite pagers, wireless internet devices, embedded computers, mainframe computers, mini-computers, workstations, network interface cards, programmable logic devices, entertainment devices, gaming devices, and any other device capable of communicating with content management system 110. The client devices may include various peripherals such as a terminal, keyboard, mouse, screen, printer, stylus, input device, output device, microphone, speaker, sound card, or any other apparatus or interface that can help relay information between a user and content management system 110.

In alternative embodiments, content management system 110 may include computer-readable instructions (e.g., one or more software applications) implemented and configured to be operated on one or more computing devices, including any of devices listed above. In such embodiments, content management system 110 may be configured to communicate with content subsystem 130 via the Internet or other suitable communication network(s).

Tools provided by content management system 110 for managing visual content 180 may include, but are not limited to, tools for creating, uploading, modifying, organizing, deleting, tracking, and otherwise managing visual content 180. With access to the tools, content providers are able to conveniently customize visual content 180.

Upon a user accessing content management system 110, a login template may be presented to the user. Content management system 110 may utilize any known login technology or technologies, including single sign-on ("SSO") technologies, which are well known to those skilled in the art.

Once the content provider successfully logs in to content management system 110, the content provider has access to tools for building and uploading visual content 180. For example, content management system 110 may include libraries of images that can be used to build visual content 180. Content providers are able to query and/or browse image libraries to identify and select images to be used to create visual content 180. Content management system 110 may be configured to allow content providers to upload images into the image libraries.

Image libraries may be specific to content providers. For example, a particular content provider may build and have access to a particular library of images. If the particular content provider is in the food services industry, for example, the content provider may create a library of images that includes visual images of menus, daily specials, and products offered by the content provider. Another particular content provider may build and use a different library of images. For example, a content provider in the banking industry may use content management system 110 to build a library of images related to the banking services offered by the content provider.

Through content management system 110, content providers are able to associate telephony identifiers and/or events (collectively "telephony attributes" or "voice communication attributes") with visual content 180. Examples of telephony attributes include, but are not limited to, voice network identifiers such as telephone numbers, portions of voice network identifiers such as area codes, country codes, and telephone number prefixes), initiation of a voice call, connection of a voice call, disconnection of a voice call, termination of a voice call, detection of predetermined telephony signals (e.g., Public-Switched Telephone Network ("PSTN"), Voice over Internet Protocol ("VoIP"), Interactive Voice Response ("IVR"), Dual Tone Multi-Frequency ("DTMF"), or other telephony signals), including telephony signals indicative of input from a call participant (e.g., data representative of an IVR or touchtone signal), or any other event or identifier capable of being represented by telephony signals. Telephony attributes may also include any information associated with subscribers to voice communication services (e.g., telephone numbers), including, but not limited to, geographic location identifiers, street addresses, zip codes, postal codes, country codes, area codes, and account identifiers associated with the subscribers.

A detection of an occurrence of telephony signals representative of a telephony attribute may trigger delivery of visual content 180 that has been predefined as being associated with the telephony attribute. Accordingly, delivery of specific instances of visual content 180 can be synchronized with telephony signals (e.g., voice signals associated with voice calls) in accordance with predefined associations provided by content providers. In certain embodiments, information (e.g., a zip code or area code) associated with a voice services subscriber may also be used to help select the instances of visual content 180 to be delivered for display. Delivery of visual content 180 will be described in detail further below.

Through content management system 110, content providers are able to track the status of visual content 180. For example, content management system 110 may be configured to determine the status of visual content 180 stored in Telex System 100. The status may indicate whether visual content 180 has been deployed on content subsystem 130 (i.e., visual content 180 is ready for delivery), edited, or deleted. Content management system 110 may be further configured to indicate the times at which visual content 180 has been created, modified, uploaded, deleted, and deployed for delivery. Content subsystem 130 may indicate when visual content 180 is unavailable for delivery (e.g., visual content 180 is being edited by a content provider). Content management system 110 may be configured to track and report the number of times visual content 180 has been delivered.

Content management system 110 may be further configured to indicate whether visual content 180 is pending approval or has been approved or rejected. An exemplary approval process will be described further below.

Content management system 110 may provide any other functions potentially useful for managing visual content 180. In certain embodiments, for example, content management system 110 provides content providers with a capability for previewing visual content 180 before or while the content is deployed on content subsystem 130.

Content management tools provided by content management system 110 may include predefined templates. In certain embodiments, the predefined templates are in the form of HTML templates (e.g., web forms). Content providers are able to use the predefined templates to perform content management functions.

Content management system 110 may be configured to provide different levels of management functions to content providers. Accordingly, content subscribers may select from different subscription classes. Examples of subscription classes may include static, dynamic, and interactive, which may correspond with the class of visual content 180 that content providers are allowed to submit. Certain content providers may elect to provide only static visual content 180, while other content providers may elect to dynamically share visual content 180. Other content providers may elect to provide interactive visual content 180 that allows voice call participants to use visual content 180 to provide interactive input to Telex System 100. Examples of static and interactive classes of visual content 180 will be described further below.

Specific predefined templates may be provided for each subscription class. For example, content management system 110 may provide a first set of content management templates to content providers in a first class and a second set of content management templates to content providers in a second class.

Content management system 110 may include one or more data stores (not shown) for storing data, including data representative of visual content 180, telephony attributes, information associated with content providers, content statuses, image libraries, and any other data useful for providing content providers with tools for managing visual content 180. Any suitable data storage technology may be used to store the data.

Content management system 110 may provide tools for submitting visual content 180 to content subsystem 130. For example, once a content provider has built an instance of visual content 180, the content provider may instruct content management system 110 to submit visual content 180 to content subsystem 130. Content management system 110 then provides visual content 180 to content subsystem 130, which is able to host visual content 180 for delivery to interactive voice displays 185 and/or 195. In certain embodiments, visual content 180 is transmitted between content management system 110 and content subsystem 130 using XML/XSLT format.

Content subsystem 130 may include one or more computing devices (e.g., servers) and computer-readable instructions configured to be executed by the computing devices. Content subsystem 130 may be configured to receive, store, and deploy visual content 180. Content subsystem 130 may also be configured to subject received visual content 180 to an approval process prior to deployment.

Figure 3:
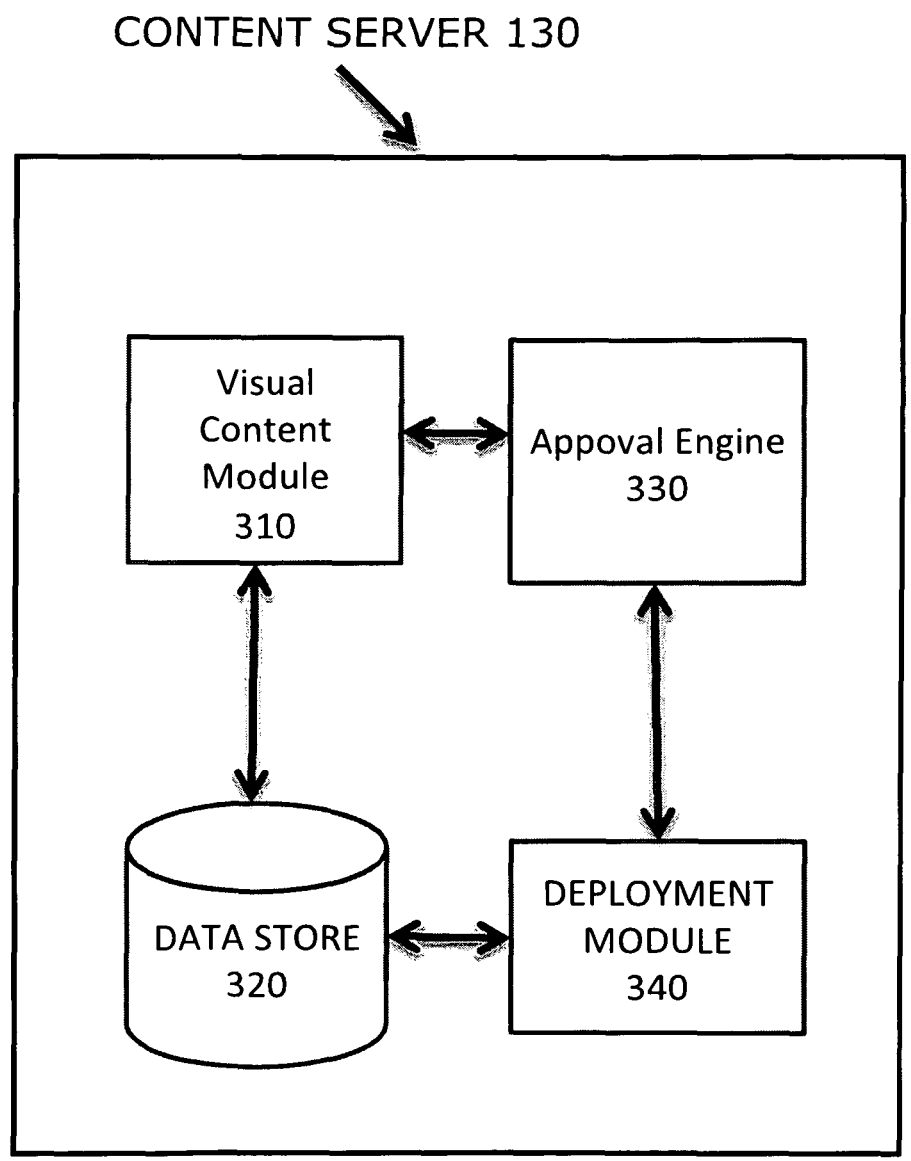
FIG. 3 is a block diagram illustrating a particular embodiment of the content subsystem of FIG. 1.

FIG. 3 is a block diagram illustrating an exemplary embodiment of content subsystem 130. As shown in FIG. 3, content subsystem 130 may include visual content module 310, data store 320, approval engine 330, and delivery module 340 communicatively coupled to one another as shown. Any suitable communication technology or technologies may be employed to communicatively couple the elements of content subsystem 130.

Visual content module 310 may be configured to receive visual content 180 from content management system 110. Visual content 180 may be stored at visual content module 310. In certain embodiments, visual content module 310 includes third-party server farms such as those provided by Vignette Corporation of Austin, Tex.

Visual content module 310 may be configured to propagate content management commands received from content management system 110 through to visual content 180 stored at content subsystem 130. Visual content module 310 may also be configured to ascertain the status of visual content 180 stored at content subsystem 130 and to make the status available to content providers through content management system 110, thereby allowing content providers to use content management system 110 to track the status of visual content 180, as described above.

Visual content module 310 may be configured to forward received visual content 180 to approval engine 330, which can subject the visual content to an approval process 350. Approval process 350 may include either or both manual and automated approval process steps, including any approval process steps known to those skilled in the art. In certain embodiments, approval engine 330 includes a workflow application configured to notify predetermined persons of the submission of visual content 180 to approval engine 330. This may be done in any suitable manner, including sending approval process messages (e.g., e-mail messages) to the predetermined persons who may have responsibility for reviewing and approving or rejecting submitted visual content 180. The predetermined persons may send their responses to approval engine 330. The responses may be in any suitable form, including e-mail messages. Any suitable workflow application may be used to submit visual content 180 to an approval process, including any workflow applications known in the art.

From the response messages, approval engine 330 can determine whether visual content 180 has been approved or rejected. Approval engine 330 may be configured to notify visual content module 310 as to whether visual content 180 has been approved or rejected. Visual content module 310 can then initiate communication of one or more status messages to the content provider who submitted visual content 180. The status messages may include notification of the status of visual content 180, including indication of whether visual content 180 has been rejected or approved. Rejection notifications may include information descriptive of one or more reasons for which visual content 180 was rejected. Additionally, if visual content 180 has been rejected, visual content module 310 can return the visual content to content management system 110 for correction and re-submission by the relevant content provider.

Status messages may be sent in any suitable manner, including visual content module 310 sending one or more e-mail messages to the content provider, or visual content module 310 communicating with content management system 110, which sends one or more status messages to the relevant content provider.

If visual content 180 has been approved, visual content module 310 may cause the visual content to be deployed. In other words, visual content 180 is made available at content subsystem 130 for delivery to Interative Displays 185 and 195 by way of application subsystem 150. Visual content module 310 can cause visual content 180 to be deployed by storing it to data store 320, which may include any suitable data storage technologies, including database and server technologies.

Delivery module 340 may be configured to query data store 320 for visual content 180 and to retrieve the identified visual content from data store 320. Retrieved visual content 180 may be cached by delivery module 340 for subsequent use, as will be understood by those skilled in the art. Queries of data store 320 may be based on data received from application subsystem 150. As shown in FIG. 3, delivery module 340 can communicate with application subsystem 150. Accordingly, application subsystem 150 may submit a request for visual content 180 to delivery module 340, which may identify and retrieve the requested visual content. If available, the requested visual content may be retrieved from cache at delivery module 340. Otherwise, the requested visual content may be retrieved from data store 320.

Delivery module 340 may respond to a request for visual content 180 by providing retrieved visual content 180 to application subsystem 150. In certain embodiments, visual content 180 can be requested by and delivered to application subsystem 150 using an XML application program interface ("API") over HTTP, which will be understood by those skilled in the art.

Content subsystem 130 may be configured to generate and maintain an index descriptive of associations between telephony attributes, deployed visual content 180, and other information associated with the visual content. For example, the index may include a list of telephone numbers and identifiers of the visual content associated with each of the telephone numbers. By way of another example, the index may include data representative of associations between visual content 180 and information such as area codes or zip codes. This allows Telex Apparatus 100 to use a wide variety of telephony attributes and predefined associations to identify visual content 180 to be displayed in sync with the occurrence of specific telephony attributes. The predefined associations may also dictate the delivery of specific instances of visual content 180 based on geographic location.

For example, a particular content provider may wish to provide different instances of visual content 180 to callers based on the geographic locations of the callers. The content provider may define visual content associations to delineate the particular instances of visual content 180 to be delivered to specific geographic locations or regions. Any geographic identifier may be used to define the associations, including area codes or zip codes, for example. In this manner, content providers are able to tailor the delivery of visual content 180 based on any telephony attributes and/or information associated with telephony events and callers. For instance, a nationwide food service organization can define visual content associations so that particular visual depictions of menus or specials are delivered to callers within a specific geographic area. This feature is especially useful when the costs or availability of goods and services differ by geographic location.

The index may include any associations defined by content providers using content management system 110. Any potentially useful information may be associated with visual content 180 in the index. For example, the index may include information comprising, but not limited to, telephony attributes, telephony signals (e.g., IVR or DTMF input), information associated with content providers, information associated with voice services subscribers, descriptions of visual content 180, visual content identifiers (e.g., web site and web page names), and any other information that may be useful for determining visual content 180 to be delivered.

The information included in index may be kept current (i.e., refreshed) by content subsystem 130. For example, when visual content 180 deployed at content subsystem 130 (e.g., deployed in data store 320 or as cached content at delivery module 340) is updated, content subsystem 130 can recognize and propagate the update to the index.

Content subsystem 130 may be configured to provide the index and index updates to application subsystem 150. For example, each update of the index may trigger delivery of an up-to-date index from content subsystem 130 to application subsystem 150. Visual content module 310 may be configured to recognize updates to deployed visual content 180, update the index accordingly, and provide the updated index to delivery module 340. Delivery module 340 may be configured to transmit the index to application subsystem 150 periodically, in response to a request from application subsystem 150, or whenever the index is updated. Application subsystem 150 or PSTN Interface 175 may use the index to identify visual content 180 to be requested, as described below.

Application subsystem 150 may be configured to communicate with PSTN Interface 175 and content subsystem 130. For example, application subsystem 150 may receive requests from PSTN Interface 175, including requests for visual content 180. The requests may include visual content identifiers and/or other information (e.g., telephony attributes) useful for identifying visual content 180. Application subsystem 150 may also receive requests from other sources over the communications network (e.g., from voice communication network 170) enabled with a PSTN Interface 175 device. Application subsystem 150 can forward requests for visual content 180 to content subsystem 130, which may be configured to respond by providing the requested visual content to application subsystem 150, as described above. Application subsystem 150 may process (e.g., transform) and forward visual content 180 to the Interactive Displays 185 and 195 users are presently viewing and/or presumed viewing based on the profile associated with the telephony attributes of the Voice Communication Devices 160 and/or 190 to response to the requests received from the PSTN Interface 175.

Figure 4:
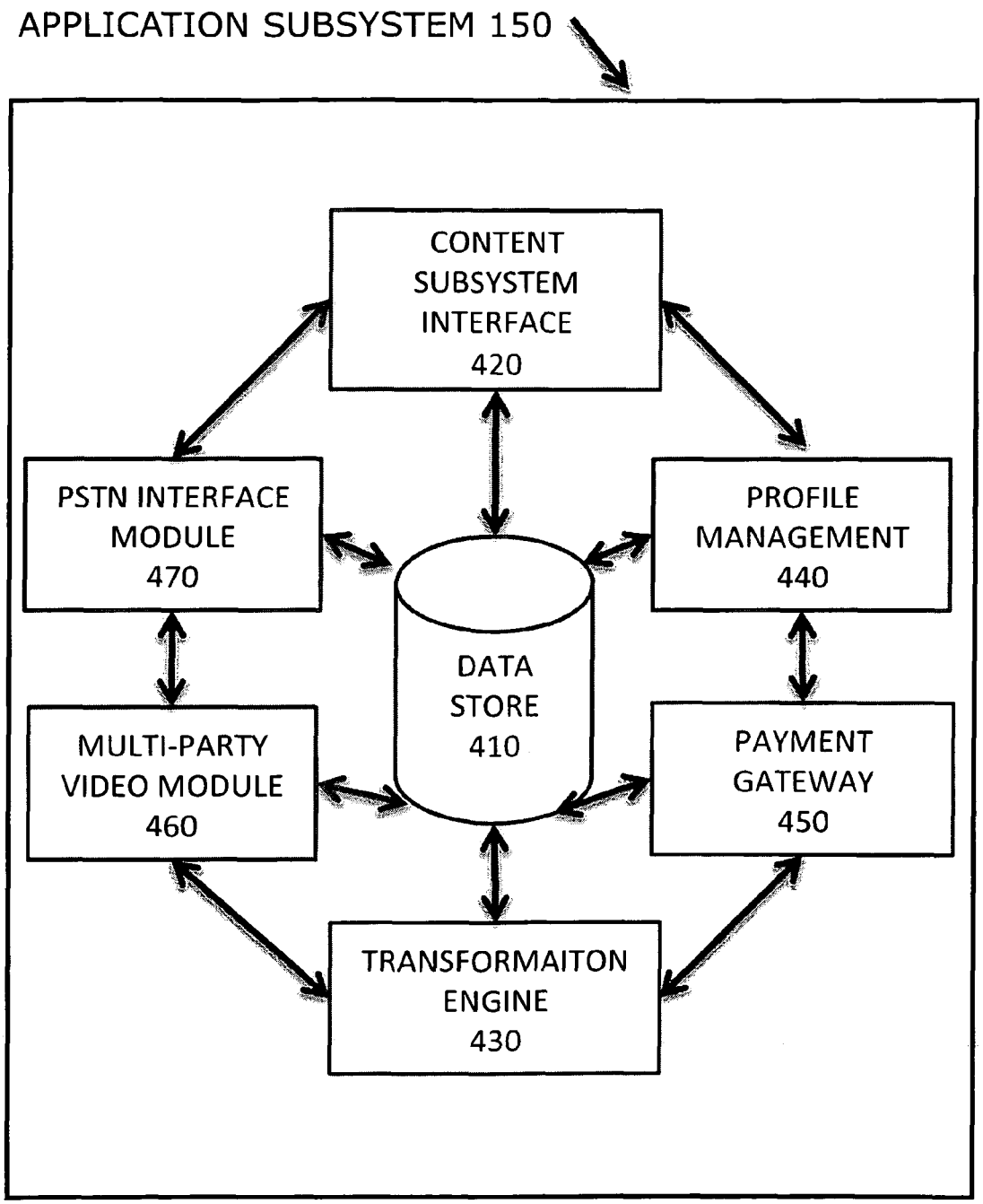
FIG. 4 is a block diagram illustrating a particular embodiment of the application subsystem of FIG. 1.

FIG. 4 is a block diagram illustrating a particular embodiment of application subsystem 150. As shown in FIG. 4, application subsystem 150 may include content subsystem interface 420, transformation engine 430, Profile management module 440, payment gateway module 450, multi-party video module 460, PSTN interface module 470, and data store 410 communicatively coupled to one another as shown and may be deployed by storing data (e.g., instructions) in data store 410, which may include any suitable data storage technologies, including database and server technologies.

Content subsystem interface 420 may be configured to communicate with content subsystem 130 to request and receive visual content 180. In certain embodiments, content subsystem interface 420 communicates with delivery module 340 of content subsystem 130 using XML/XLST over HTTP.

The Profile manager 155 may be deployed at the profile management module 440. User profiles are maintained in Profile manager 155 for the purpose of independently associating voice callers with Interactive displays they are presently viewing and/or assumed viewing, as well as for privacy setting, content viewing preferences, content storage, and to facilitate payments and private information sharing and any other relevant user specifications.

Payment gateway module 450 facilitates, manages, and records payments and/or interfaces with $3^{rd}$ party payment systems. Using flexible permissions, the user and/or agent may conduct financial transactions and direct the flow of funds without having to enter bank account, credit, debit, or gift card numbers, expirations dates, or security codes.

Multi-party video module 460 may facilitate, manage, and record multiparty video sessions and/or interface with $3^{rd}$ party multiparty video systems. Using associations and flexible permissions stored in the profile manager 155, the user and/or agent may conduct video sessions without having to enter "room numbers" or click on links to initiate video sessions. For example, a user may call from voice communication device 160 known to the profile manager 155 and be bridged into a multi-party video session by voice and by video on interactive display 185.

PSTN Interface Module 470 may handle communication with PSTN interface 175 deployed in a telephone switch, IVR application, or in some other off-premise application. Voice calls route through the existing PSTN in the usual fashion known to those skilled in the art.

Transformation engine 430 may be configured to transform messages between first and second formats, including converting visual content 180 in a first format to visual content in a second format. The first format may be suitable for communications between application subsystem 150 and content subsystem 130, and the second format may be suitable for communications between application subsystem 150 and interactive displays 185 and 195. In certain embodiments, for example, transformation engine 430 is configured to convert messages between XML and HTML formats to allow visual content 180 deployed in XML format to be transformed and transmitted to interactive displays 185 and 195 in HTML format. This allows standard browser applications operating interactive displays 185 and 195 to display visual content 180.

Of course, Telex apparatus 100 is not limited to using particular data formats. Any suitable data formats and communication protocols may be used to collect and deliver visual content 180 upon detection of an occurrence of telephony attributes predefined as being associated with the visual content.

In certain embodiments, application subsystem 150 is configured to forward the index described above from content subsystem 130 to PSTN interface 175. This enables the PSTN Interface 175 to use associations included in the index to identify visual content 180 to be requested in response to detection of an occurrence of a predefined telephony attribute associated with a voice call. By identifying, at PSTN interface 175, specific instances of visual content 180 to be requested, data traffic transmitted between PSTN interface 175 and application subsystem 150 can be reduced.

In other embodiments, however, it may be desirable to minimize processing at PSTN Interface 175. In such embodiments, application subsystem 150 may be configured to receive a request from PSTN Interface 175, use information included in the request (e.g., a telephone number) to query the index to identify specific instances of visual content 180, and send a request for the visual content to content subsystem 130. Such configurations are especially useful legacy switching networks, in other embodiments in which local capacity may be limited or in switching networks exclusively dedicated to visual telephony enabled attributes.

In some embodiments, it may be desirable to control the delivery of visual content from network elements deployed in the voice communications network 170. For example, where the visual content is associated with an interactive voice response ("IVR") facility, it may be desirable for the IVR system to control delivery of visual content. Application subsystem 150 may be configured to receive requests over the communications network from a remote source, such as a network element (e.g., an IVR system or control element) deployed as part of the voice communications network 170 by adding a PSTN interface 175 at said remote source. Application subsystem 150 may also be configured to use the information in the requests to identify specific instances of visual content 180, and send a request for the visual content to content subsystem 130. Application subsystem 150 may further be configured to provide the index to the remote source PSTN interface 175.

Voice communication devices 160 and 190 may include any device(s) and/or interface(s) capable of sending and/or receiving voice communications over voice communication network 170 (which may be accessible via access network 165). For example, voice communication devices 160 and 190 may include, but is not limited to, one or more voice-enabled personal data assistants, mobile telephones (cellular telephones), satellite pagers, video phones, modems, IP phones, SIP phones, POTS phones, PSTN devices, computing devices operating softphones or other voice communication software, entertainment devices, gaming devices, and any other devices capable of sending and/or receiving voice communications (e.g., voice calls) over voice communication network 170. Voice communication devices 160 and/or 190 may be configured to receive and recognize input from a user by touch-screen, mouse, keyboard, voice, gesture, or any other technologies known in the art.

As used herein, the term "voice communications" is meant to be understood broadly as any communications that include voice signals. In certain embodiments, voice communications include voice calls associated with voice communication services provided over voice communication network 170. In a preferred embodiment, a voice signal of a voice communication is not the same as a data signal of a data communication transmitted by a modem.

Voice communication network 170 may include any network(s) capable of carrying voice communications between voice-enabled devices. Voice communication network 170 is typically configured to carry voice service communications between devices, including voice communications associated with PSTN services, mobile telephone services, and VoIP services, for example. Voice communication network 170 may employ any voice service communication technologies known to those skilled in the art.

Interactive displays 185 and 195 may include any device(s) and/or interfaces capable of requesting, receiving, and/or displaying visual content 180, including, for example, IP-enabled display devices, computer, cell-phone, tablet, auto dashboard screen, set-top boxes, modems, IP-enabled having display capabilities, and IP-capable video platforms (e.g., IP-capable televisions or projectors).

Interactive displays 185 and 195 may include one or more devices having one or more visual display screens, as well as applications configured to instruct the device(s) to display visual content 180 on the screen(s). In certain embodiments, the applications are in the form of one or more web browsers, including any web browser known in the art.

In certain embodiments, voice communication devices 160 and/or 190 and interactive displays 185 and/or 195 may be incorporated into a single device that includes voice communication, IP-based communication, and interactive display capabilities, such as a mobile phone. The device may be configured for voice communications over voice communication network 170, IP-based communications (e.g., HTTP) with application subsystem 150 over a data network, and display capabilities for displaying visual content 180. The voice communications and IP-based communications may be over a single access network 165, for example, a DSL-enabled network, a DOCSIS-enabled network, or a passive optical network ("PON") with voice/data capabilities. For example, the voice communication device may comprise desktop set or set-top box that combines voice communications with Internet access.

In certain other embodiments, a single system may include one or more voice communication devices 160 and/or 190 (e.g., telephones), IP-capable communication devices (e.g., set-top boxes), and IP-platform interactive displays 185 and/or 195 devices (e.g., IP-platform televisions). For example, an on-premise system may include one or more set-top boxes and televisions configured to operate with video services such as fiber-optic video services.

In another example, a call center 120 may include a multitude of voice communication devices 160 and/or 190 and interactive displays 185 and/or 195 devices on the same local or wide area network. The different devices may be communicatively coupled with Telex Apparatus 100 (e.g., by a local area network) so that display of visual content 180 can be synchronized with telephony signals.

Figure 5:
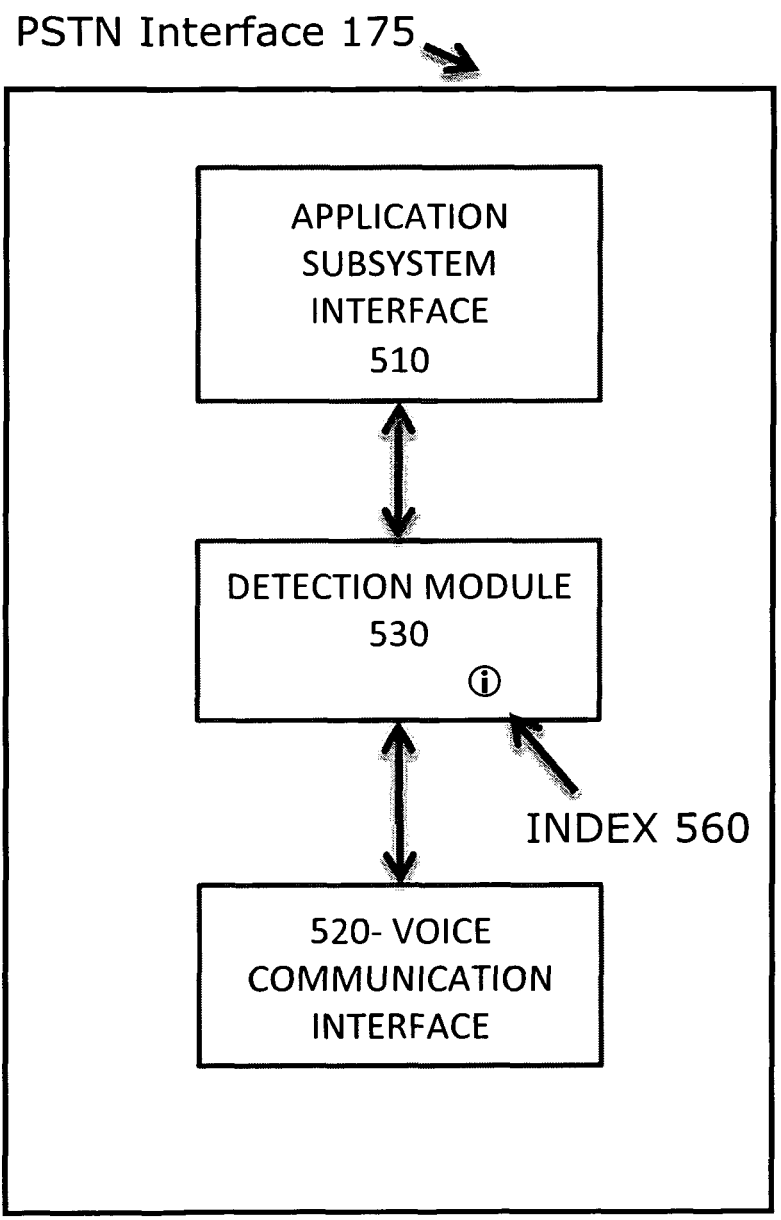
FIG. 5 is a block diagram illustrating a particular embodiment of the PSTN interface of FIG. 1.

Turning now to FIG. 5, which is a block diagram illustrating a particular embodiment of PSTN interface 175 of FIGS. 1-2. As shown in FIG. 5, PSTN interface 175 may include application subsystem interface 510 voice communication interface 520, and detection module 530, communicatively coupled to one another as shown. It is essential to note that the PSTN interface 175 may be deployed in the communications network 170, IVR application, or in any other off-premise application known to those skilled in the art, and not as part of the voice communication devices 160 and/or 190. Any suitable communications technologies may be employed to communicatively couple the elements of FIG. 5.

Voice communication interface 520 may be configured to act as a communication interface with voice communication network 170. Accordingly, voice communication signals between voice communication network 170 and users of voice communication devices 160 and/or 190 pass through voice communication interface 520. In addition, visual selections from the interactive displays 185 and 195 may be translated in the voice communication network, digitally or into touchtone signal (i.e., a DTMF signal) where emulation of the voice communication devices 160 and/or 190 is required.

Therefore, the presentation of visual content 180 may be synchronized with existing automated telephone applications (e.g., interactive voice response applications and automated operators) to enhance user experiences with the automated telephony applications. For example, menu choices may be visually displayed while an automated operator audibly recites the same menu choices.

Voice communication interface 520 may employ any technologies and/or devices for interfacing with voice communication network 170, including technologies known in the art.

Detection module 530 may be configured to detect any voice communication signals passing through voice communication interface 520. For example, detection module 530 can recognize signals representative of telephony attributes (e.g., telephony identifiers or events), including, but not limited to, a telephone number dialed by a user of voice communication devices 160 and/or 190 (e.g. DNIS or dialed number identifications service), the telephone numbers of the voice communication devices 160 and/or 190 (e.g ANI), a touchtone signal (i.e., a DTMF signal), and an IVR signal.

Detection module 530 may use the recognized telephony attributes to identify visual content 180 and user profiles that have been predefined as being associated with the telephony attributes. For example, detection module 530 may query index 560 for a telephony attributes and use information included in index 560 to identify visual content 180 associated with a telephony attribute, to identify users and their interactive displays 185 and/or 195, or to place users into an multi-party video conference. More specifically, detection module 530 may identify a visual content identifier (e.g. DNIS) included in index 560, which identifier is useful for requesting delivery of specific instances of visual content 180, and a user identifier (e.g. ANI), which identifier is useful for requesting user profile from the profile manager 155, together with which appropriate content can be sent or directed to interactive displays 185 and/or 195, the user and/or agent is presently viewing and/or presumed viewing based on the index of telephony attributes.

Index 560 may include any of the information described above in relation to the index maintained at content subsystem 130 and profile manager 155. Index 560 may be stored in any suitable data store (e.g., a local cache not shown) at PSTN interface 175. As noted above, index 560 may alternately be implemented at application subsystem 150.

Detection module 530 may use information included in index 560 to form a request for the identified visual content 180 or user profile 155. The request may include any suitable identifier of the visual content or user profile, including, for example, a network address (e.g., a Uniform Resource Locator ("URL")) or a database record. Detection module 530 can send the request to application subsystem 150 by way of application interface 510, which can function as an interface to application subsystem 150, as described below.

In addition to visual content, user profile, and display identifiers, index 560 may include at least a subset of visual content 180. For example, index 560 may include predetermined introductory visual content pages associated with content providers, or essential instructions to create visual content (e.g. an introductory menu).

A designated introductory page may be sent and displayed at interactive displays 185 and 195 while additional instances of visual content 180 is being retrieved from content subsystem 130. By way of example, when a user of a voice communication device 160 and/or 190 dials a target telephone number, detection module 530 may determine whether index 560 includes visual content 180 associated with the target telephone number and whether the voice communication device 160 and/or 190 are associated with a predefined user or display. If such visual content 180 is included in index 560, detection module 530 may immediately send the visual content to the interactive displays 185 and 195 users are presently viewing and/or presumed viewing based on the profile associated with the telephony attributes of the voice communication devices 160 and/or 190 while additional visual content 180 (i.e., visual content associated with a visual content identifier included in index 560) is being requested and retrieved from content subsystem 130.

Accordingly, content providers may select visual content 180 such as an introductory page that will be sent and displayed to users presently viewing and/or presumed viewing the interactive displays 185 and 195 virtually immediately upon recognition of telephony signals representative of predefined telephony attributes. Introductory pages or other selected instances of visual content 180 may attract the attention of users while additional visual content 180 is being retrieved. In addition, the PSTN interface 175 modules may serve as a distributed back-up in the event that the application subsystem 150 fails.

Application subsystem interface 510 may be configured to act as a communication interface with application subsystem 150. Application subsystem interface 510 may include any device(s) and application(s) useful for interfacing communications, including modems and network interface cards, for example. In many embodiments, communications between application subsystem 150 and PSTN interface 175 are IP-based (e.g., XML/XSLT over HTTP). For instance, application subsystem 150 and PSTN interface 175 may communicate with one another over a data network via the access network 165 (e.g., a wide area network such as the Internet).

Figure 6:
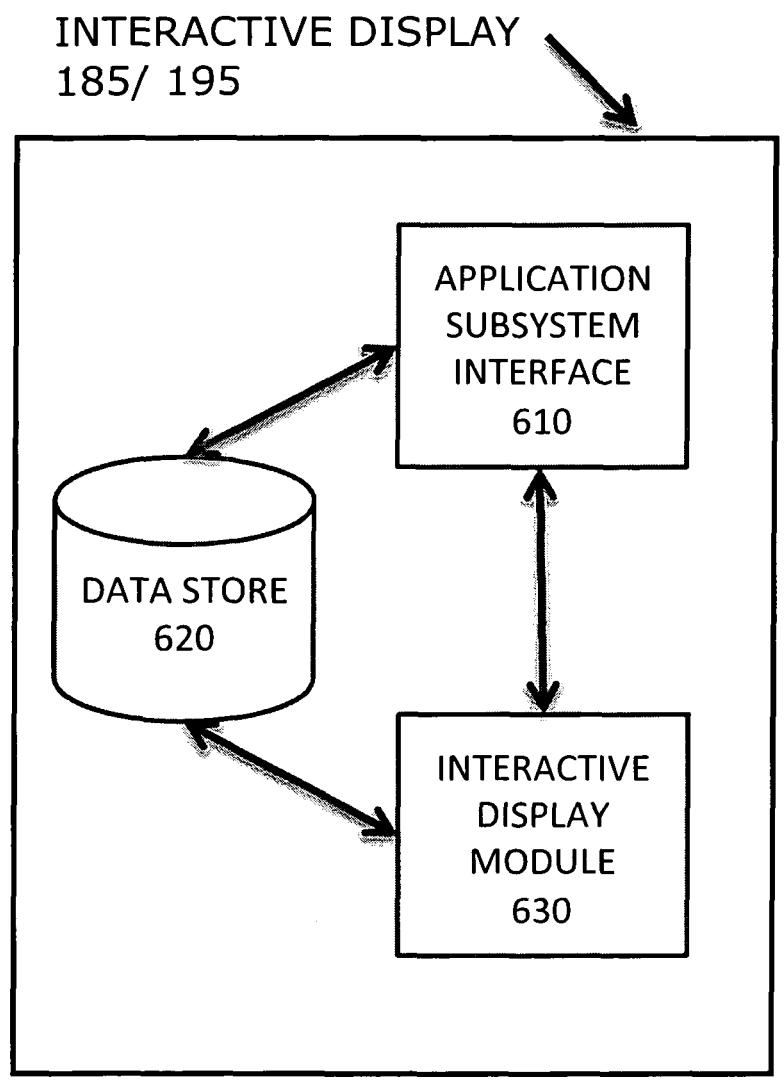
FIG. 6 is a block diagram illustrating a particular embodiment of the interactive displays of FIG. 1.

FIG. 6 is a block diagram illustrating a particular embodiment of interactive displays 185 and 195 of FIGS. 1-2. As shown in FIG. 6, interactive displays 185 and 195 may include application subsystem interface 610, local data store 610, and interactive display interface 630 communicatively coupled to one another as shown. Any suitable communications technologies may be employed to communicatively couple the elements of FIG. 6.

Application subsystem interface 610 may be configured to act as a communication interface with application subsystem 150. Application subsystem interface 610 may include any device(s) and application(s) useful for interfacing communications, including modems and network interface cards, for example. In many embodiments, communications between application subsystem 150 and the interactive displays 185 and 195 are IP-based (e.g., XML/XSLT over HTTP). For instance, application subsystem 150 and interactive displays 185 and 195 may communicate with one another over a data network via the access network 165 (e.g., a wide area network such as the Internet).

Local data store 620 may include one or more data stores (not shown) for locally storing content, including data representative of visual content 180, telephony attributes, information associated with content providers, content statuses, image libraries, session recording, and any other data useful for immediate access to visual content associated with user or that may be of interest to user. For example, Local Data Store 620 may include predetermined introductory visual content elements to create an introductory menu with minimal instructions. Any suitable data storage technology may be used to store the data.

Interactive display interface 630 may include any suitable technologies for displaying visual content 180, including, for example, one or more display devices and applications (e.g., standard web browsers). Interactive display interface 630 may be configured to receive and recognize input from a user by touch-screen, mouse, keyboard, voice, gesture, or any other technologies known in the art.

Interactive display 185 and 195 may utilize any known login technology or technologies, including single sign-on ("SSO") technologies, which are well known to those skilled in the art. Visual display may be restricted by parental controls and/or inhibited for safely reasons. For example, content in a dashboard display of a car may be restricted to slow changing pictures while the caller is driving. For other content, the display may be restricted to adults known to be over 18 years of age.

As mentioned above, in the Telex apparatus 100 of the present invention, detection of a caller's telephony identifiers is done at the network level, thus allowing the consumer to enjoy robust, substantially synchronized visual content and interaction without purchasing any new devices or equipment. A POTS line and a network enabled visual display, such as a computer, cell phone, set-top box, TV, tablet, auto dashboard display, is all that is required.

In one embodiment according to the present invention, a visual telephony session is initiated by calling a hosted toll-free number. A hosted toll-free number is a number hosted by the same carrier as the detection module 530 described below in connection with FIG. 5. The advantages of using a hosted toll-free number are that the telephony identifiers (e.g. ANI and DNIS) are preserved beyond the initial carrier connection and that telephony identifiers are available for detection by the called party and/or the carrier that hosts the toll-free service, regardless of the unique route calls may take through the voice communications network.

For example, a user may place a call from a simple POTS line to a toll-free number which has pre-defined content and that content will then appear on their desktop display, provided that user has logged in or pre-associated that desktop display in the profile manager.

A call placed by and/or any voice signals from voice communication devices 160 and/or 190 (e.g. POTS line) passing into or through the voice communications network 170 will be detected by the shared PSTN interface 175 and, if the telephony attributes indicate pre-defined content, the application subsystem 150 will send visual content 180 to the interactive displays 185 and 195 users are presently viewing and/or presumed viewing based on the profile in the profile manager 155 associated with the telephony attributes of the voice communication devices 160 and/or 190.

Concurrently, requests or responses to requests from the interactive displays 185 and/or 195 may be sent to application subsystem 150 through the application subsystem interface 610 and on to the voice communication network 170 elements via the shared PSTN interface 175 to synchronize audio presentation with visual selections (e.g. IVR scripting). In addition, responses to the requests may be received through application subsystem interface 610, including responses in the form of visual content 180. Visual content 180 may be received in the form of HTML messages.

The received visual content 180 may be forwarded to interactive displays 185 and 195, which are configured to display visual content 180 for consideration by a user presently viewing and/or presumed viewing. Interactive displays 185 and 195 may include any suitable technologies for displaying visual content 180, including, for example, one or more display devices and applications (e.g., standard web browsers). Interactive displays 185 and 195 may be configured to receive and recognize input from a user by touch-screen, mouse, keyboard, voice, gesture, or any other technologies known in the art.

In this above-described manner, Telex apparatus 100 is able to provide specific instances of visual content 180 for display, the visual content being provided in response to detection of predefined telephony signals. Accordingly, any user of Telex apparatus 100 can receive both voice signals associated with a voice call and visual content 180 identified as being associated with telephony attributes associated with the voice call. Voice signals may be received at communication devices 160 and/or 190 substantially simultaneously with visual content 180 received at interactive displays 185 and 195. This allows a user of Telex apparatus 100 to be presented with both visual content 180 and voice signals in a manner that allows them to efficiently consider both types of content at virtually the same time.

The display of visual content 180 at interactive displays 185 and 195 can be synchronized with telephony signals representative of predefined telephony attributes. In certain embodiments, the display of visual content may be synchronized with playback of voice signals at communication devices 160 and/or 190. Synchronized delivery of visual content 180 and voice signals to voice call participants expands the amount, quality, and presentation of information to the call participants, especially initiators of voice calls to telephone numbers associated with content providers. Moreover, content providers enjoy expanded options for building and presenting content to voice call participants. Visual voice calls provide a useful and convenient way to provide information and services to users of voice communication services.

Visual content 180 may include any data representative of information (e.g., images and text) capable of being displayed, or transformed and displayed, at interactive displays 185 and 195. In certain embodiments, for example, visual content 180 includes one or more visual content pages (e.g., web pages). The visual content pages may be organized hierarchically into groups (e.g., web sites), which groups may be associated with particular content providers. Visual content pages and sites can be assigned identifiers (e.g., URL addresses) useful for identifying and accessing the pages and sites or unique visual content may be created just for users of Telex 100.

By way of an example, a particular content provider may build visual content including one or more pages, assign identifiers to the pages, and associate the pages with telephony attributes. A detected occurrence of telephony signals representative of one of the telephony attributes will trigger delivery and display of the corresponding visual content page.

As introduced above, visual content 180 may include different classifications of content, including, but not limited to, static, dynamic, and interactive. Static visual content refers to content configured simply for display at interactive displays 185 and 195. Static content may include any information capable of being displayed visually, including, for example, information about content providers and/or information descriptive of products and services being offered. Examples of static visual content may include food menus, advertisements, coupons, addresses, driving directions, maps, and any other information configured to be visually displayed in a static fashion.

Dynamic visual content may include any content that is updated in near real time or that changes visual appearance during display such as video. Content providers may elect to share content dynamically with Telex apparatus 100.

Interactive visual content may include any content configured to elicit and accept user input. For example, interactive visual content may include data entry fields and selectable menu options. Interactive visual content allows voice call participants to use the visual content to provide input, including making selections by touching menu options displayed on a display screen at interactive displays 185 and 195. This feature may be referred to as interactive visual response, which functions similarly to interactive voice response, except that user input may be received through touch-screen selections instead of or in addition to input being received through voice responses. Interactive visual content allows call participants to quickly and conveniently navigate through menu options associated with a voice call, without having to wait for menu options to be audibly recited.

Presentation of visual content 180 may be synchronized with existing automated telephone applications (e.g., interactive voice response applications and automated operators) to enhance user experiences with the automated telephony applications. For example, menu choices may be visually displayed while an automated operator audibly recites the same menu choices.

Visual content 180 may also include different categories of content. Exemplary categories may include, but are not limited to, industry-specific categories (e.g., food services, financial, travel, lodging, retail, telecommunications, information technology, customer service, and healthcare industries). Categorization of visual content 180 may be useful for determining the visual content to be delivered in certain situations and in accordance with predefined preferences of users of Telex apparatus 100.

Telex apparatus 100 provides users of voice communication services with combined visual and voice communication services. Visual content 180 can be displayed synchronously with the occurrence of predefined telephony attributes, as described above. For example, a user of communication devices 160 and/or 190 may initiate a voice call to a telephone number associated with a local restaurant. When the user dials the telephone number, Telex apparatus 100 may recognize the occurrence of telephony signals representative of the telephone number. Visual content 180 predefined as being associated with the telephone number is then identified and displayed to the user's interactive displays 185.

The visual content 180 may include a menu of food services and products offered by the local restaurant. Accordingly, the caller does not have to wait for a human operator to audibly describe the menu. Moreover, the visual content 180 may include images helpful for making a selection from the menu.

Other content providers may similarly associate visual content 180 with telephone numbers so that callers are presented with visual information about the products and services offered by the content providers. For example, a banking institution may define visual content 180 to be displayed to callers. The visual content 180 may enable callers to conveniently and interactively use the services provided by the banking institution.

Figure 7:
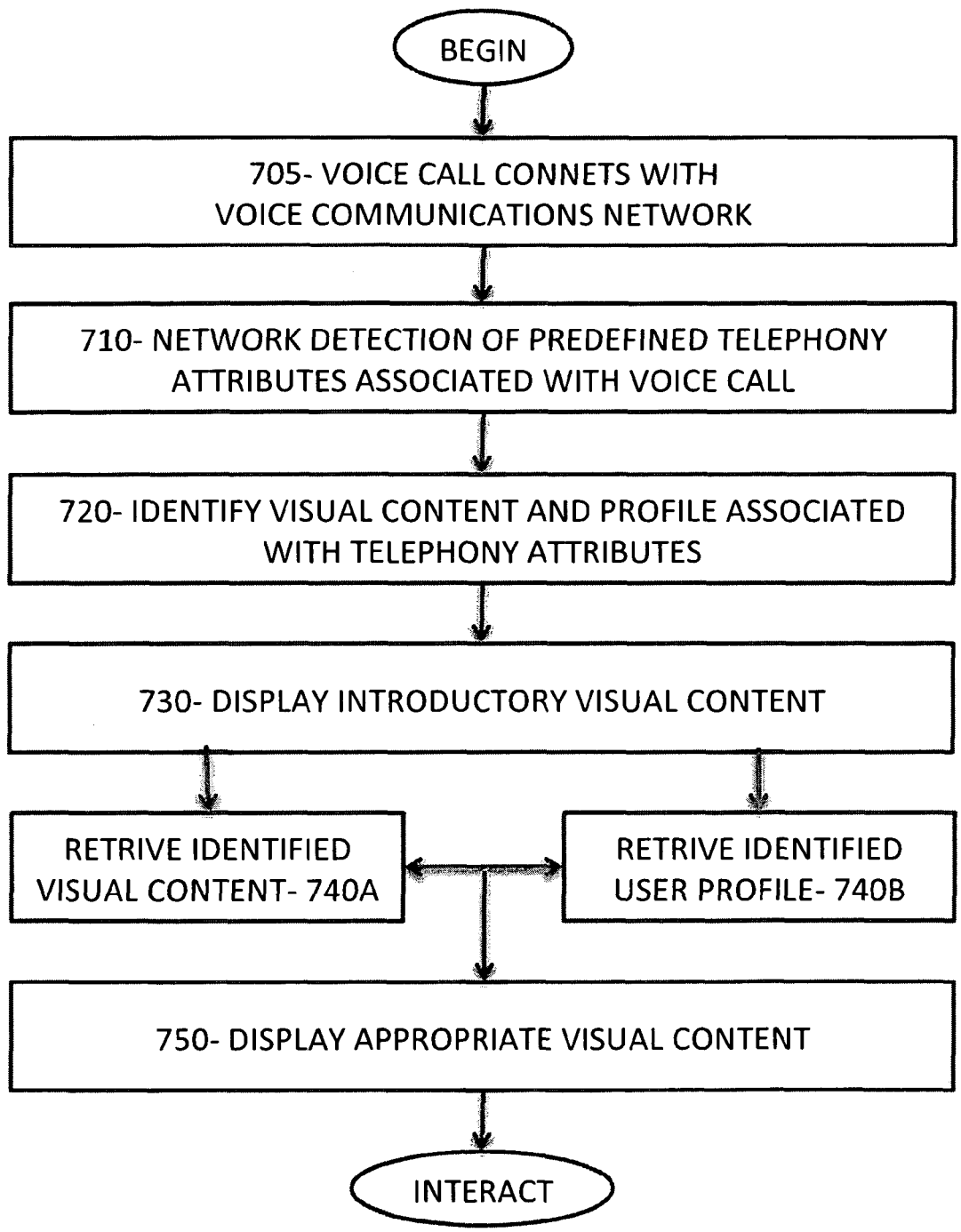
FIG. 7 is a flowchart illustrating an exemplary process for providing visual content in response to recognition of an occurrence of predefined telephony signals, according to an embodiment of the present invention.

In addition to the above, elements within the voice communication network 170 may recognize the occurrence of a telephony attribute, and send a request to Telex apparatus 100 to provide a particular item of visual content 180. For example, a network element within voice communication network 170 with a PSTN interface 175 may detect a call attempt to a toll free telephone number associated with a content provider. The PSTN interface 175 may then make a request to Telex apparatus 100 (e.g., to application subsystem 150 as shown in FIG. 1 AND FIG. 2) to provide visual content 180. Likewise, an IVR system with a PSTN interface 175 within the voice communication network may detect a telephony event (e.g., a DTMF tone), and may then make a request to application subsystem 150 to provide visual content 180. The request may include an identifier for the calling party (e.g., a telephone number) because ANI on a toll-free number is not subject to caller ID blocking, which may then be used by the profile manager 155 to determine the destination of the interactive displays 185 and/or 195 for the visual content 180. Referring now to FIG. 7, which is a flowchart illustrating an exemplary process for providing visual content in response to recognition of an occurrence of a predefined telephony signal indicative of a visual voice call. While FIG. 7 illustrates exemplary steps according to one embodiment, other embodiments may omit, add to, and/or modify any of the steps shown in FIG. 7.

In step 705 a voice call is placed and connects with the voice communication network 170, shown in FIGS. 1-2. In one embodiment, a call is placed using a hosted toll-free number to preserve ANI and DNIS within the voice communication network 170, and to ensure detection of the telephony attributes by a shared PSTN interface 175 device. In another embodiment, a call is placed on a local number where a shared PSTN interface 175 device is deployed in the switch network where telephony attributes may be preserved and conveyed. Telephony attributes may include the caller's phone number, and the called phone number, among other items.

In step 710, an occurrence of a predefined telephony attribute associated with a voice call is detected in the network. Step 710 may be performed in any of the ways described above, including detecting telephony signals (e.g., DTMF signals) at a PSTN interface 175 within voice communication network 170. Predefined telephony attributes may include any of the information described above, including the ANI and DNIS of the toll-free voice call, for example.

In step 720, visual content and user profile predefined as being associated with the detected telephony signals representative of telephony attributes are identified. Step 720 may be performed in any of the ways described above, including querying an index (e.g., index 560) stored at an application subsystem 150 or PSTN interface 175 in the voice communication network 170 for the telephony attributes and identifying visual content and interactive displays 185 and/or 195 associated with the telephony attributes.

In step 730, introductory visual content is caused to be displayed for consideration by a voice call participant. Step 730 may be performed in any of the ways described above, including pulling introductory visual content, or essential instructions to create visual content, from index 560 and displaying the introductory visual content at Interactive Displays 185 and 195 the user is presently viewing and/or presumed viewing.

In step 740, the visual content and the user profile identified in step 720 are retrieved. Step 740 may be performed in any of the ways described above, including a PSTN interface 175 located within voice communication network 170 or within elements of the voice communication network 170 (e.g. an IVR application) requesting the visual content from application subsystem 150 which in turn requests the visual content from content subsystem 130 (740A) and user profile from the application subsystem (740B).

In step 750, the retrieved visual content and user profile are combined and the appropriate visual content is displayed at the interactive displays 185 and 195 for consideration by a call participants. For example, the user profile may indicate that caller is underage and may restrict the display of certain adult content. Step 750 may be performed in any of the ways described above, including displaying the visual content at the interactive displays 185 and 195.

The method illustrated in FIG. 7 delivers and displays visual content synchronously with the occurrence of a predefined telephony attribute. Accordingly, call participants can receive visual content and audio content associated with voice calls. Visual voice calls can provide substantial information and options to call participants in a convenient and useful fashion. In many cases, voice call participants can use the visual information to quickly and conveniently consider information and make selections.

Figure 8:
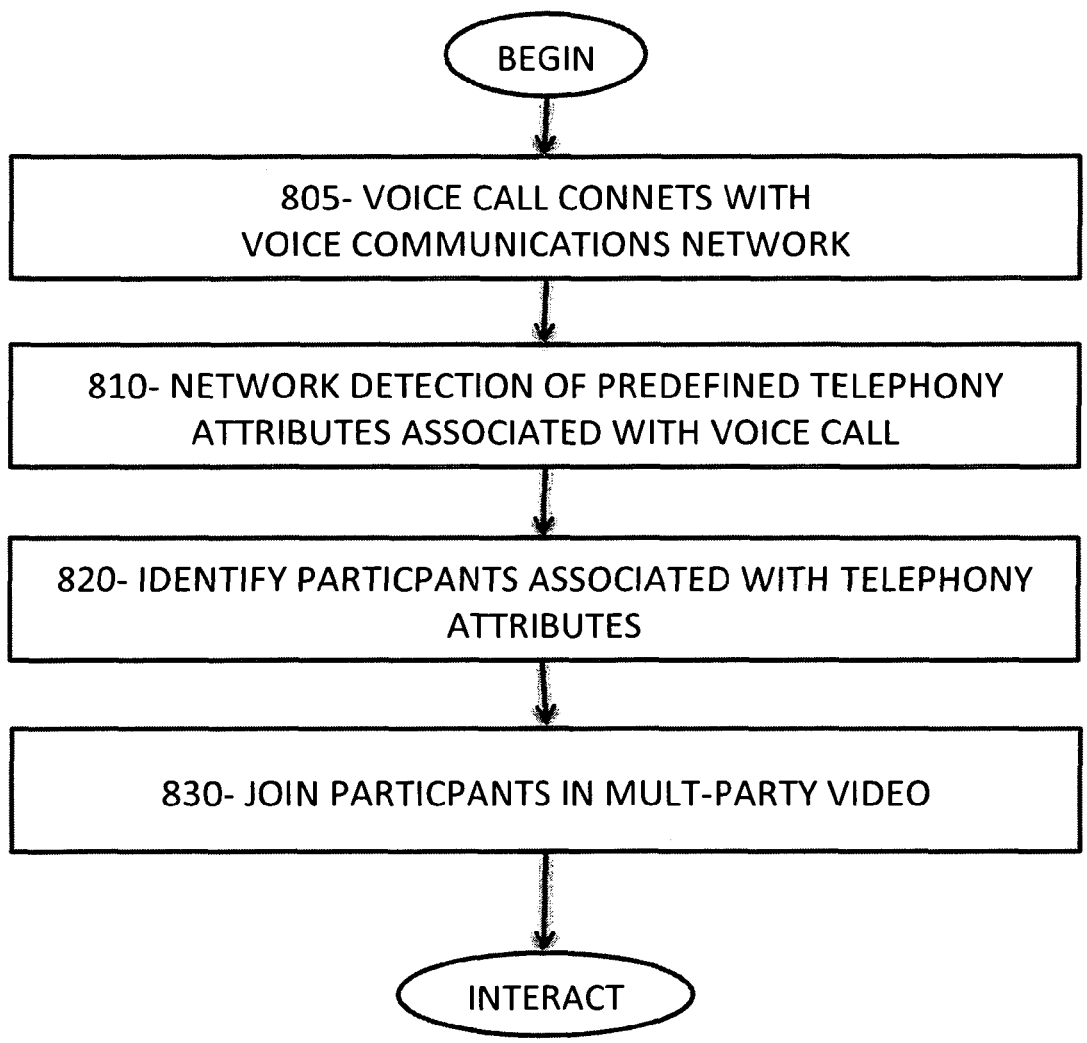
FIG. 8 is a flowchart illustrating an exemplary process for joining participants in a multi-party video conference in response to recognition of an occurrence of predefined telephony signals, according to another embodiment of the present invention; and It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

Now turning to FIG. 8, which is a flowchart illustrating an exemplary process for joining participants in a multi-party video conference in response to recognition of an occurrence of a predefined telephony signal indicative of a visual voice call. While FIG. 8 illustrates exemplary steps according to one embodiment, other embodiments may omit, add to, and/or modify any of the steps shown. For example, the method may be used to join participants in a multi-party video conference with content displayed using method described in FIG. 7.

In step 805 a voice call is placed and connects with the voice communication network 170. In the preferred embodiment, a call is placed using a toll-free number to preserve ANI within the voice communication network 170 and to ensure detection of the telephony attributes by a shared PSTN interface 175 device. In another embodiment, a call is placed on a local number where a shared PSTN Interface 175 device is deployed in the switch network where telephony attributes may be preserved and conveyed.

In step 810, an occurrence of a predefined telephony attributes associated with voice call is detected in the network. Step 810 may be performed in any of the ways described above, including detecting telephony signals (e.g., DTMF signals) at a PSTN interface 175 within voice communication network 170. Predefined telephony attributes may include any of the information described above, including the ANI and DNIS of the toll-free voice call, for example.

In step 820, the predefined user profile associated with the detected telephony signals representative of a telephony attributes are identified. Step 820 may be performed in any of the ways described above, including querying an index (e.g., index 560) stored at an application subsystem 150 or PSTN interface 175 in the voice communication network 170 for the telephony attributes and identifying interactive displays 185 and/or 195 associated with the telephony attributes.

In step 830, participants are joined in a multi-party video conference. Step 830 may be performed in any of the ways described above, including instructing the voice communication system to bridge the voice call through the PSTN interface 175 and joining interactive displays 185 and/or 195 through the application subsystem 150, or as a proxy for call center 120 and/or a $3^{rd}$ party multiparty video service. Callers may reengage with the called party by redialing or visual selection, and rejoin the session at any time.

The method illustrated in FIG. 8 connects participant into a multi-party video conference in a convenient and useful fashion, without having to enter "room numbers" or click on links to initiate video sessions. In many cases, voice call participants can use the multi-party video conference to quickly and conveniently interact.

In a comprehensive example, using the method in FIG. 7, a caller dials a toll-free number from their voice communication device 160 while logged-in to an interactive display 185 with a user name and pass-code. As the call connects through the voice communication network with the carrier hosting the toll free number, the PSTN Interface 175 device detects the telephony identifiers (e.g. the caller's number and the dialed number) and sends those identifiers back to the application subsystem 150, and may send introductory visual content, or essential instructions to create visual content to a pre-associated interactive display 185, if contained in the index 560.

In the profile manager 155 the caller's telephony identifier (e.g. caller's number) is queried to see if the caller's number is pre-associated with an interactive display 185 and user profile. Concurrently, the dialed numbers telephony identifier (e.g. toll-free number) is queried in content subsystem 130 for predefined visual content 180. If pre-defined visual content 180 exists, the user profile allows, and an interactive display 185 is known, appropriate visual content is immediately sent via the transformation engine 430 to an interactive display 185 and displayed. The visual content displayed during the session is recorded along with any audio or visual interactions, and is available for review subsequent to the session.

As a further example, the caller above may have been browsing visual content while the voice call is progressing or in queue. Using the method in FIG. 8, the agent's pre-associated interactive display 195 may automatically be joined with the caller's interactive display 185 in a multi-party video session with content sharing via the multiparty video module 460 as the voice call is answered. Because the session continues being recorded, the agent is free to look back on the prior activity of the caller, if any. Predefined permission selections permit the parties to elect how they interact and share content. For instance, the caller may grant permission for the agent to make screen selections on their screen or for the agent to see them via video.

If the caller needs escalation, the agent may join other parties in the multi-party video call or transfer the session all while recording continues. Or, if the caller desires to have a family member see and discuss the merchandise before making a buying decision they may have them call on their pre-registered voice communication device 160, sign in to Telex apparatus 100 using known credentials, or register as they call.

Finally, if the caller elects to purchase the merchandise, payment can be conveyed along with shipping address, billing address, and other information held in the user profile, the voice enabled device, or from some other network location.

Upon hang up, the visual content and capabilities endure in the caller's display. If, for instance, the family member was unable to join the call, a recorded session is available for later viewing as well as the interactive content. The caller and family member may rejoin the visual session with the merchant at any time as well as request that the agent rejoin the voice call.

FIGS. 1-8 and the above discussion are intended to provide a description of the Telex apparatus 100 and associated environment in which the Telex apparatus 100 may be implemented. The Telex apparatus 100 may include computer-executable instructions, such as program modules, being executed by a computer. Generally, program modules include routines, programs, objects, components, data structures, etc. that perform particular tasks or implement particular abstract data types. Moreover, those skilled in the art will appreciate that the Telex apparatus 100 may be practiced with other computer system configurations, including hand-held devices, multiprocessor systems, microprocessor-based or programmable consumer electronics, network PCs, minicomputers, mainframe computers, and the like. The Telex apparatus 100 may also be practiced in distributed computing environments where tasks are performed by remote processing devices that are linked through a communications network. In a distributed computing environment, program modules may be located on both local and remote memory storage devices.

As will be appreciated by one of skill in the art, embodiments of the present invention may be provided as methods, systems, or computer program products such as an article of manufacture including a tangible non-transitory computer-readable storage medium having computer-readable instructions encoded thereon. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to a block diagram of methods, apparatus, systems and computer program products according to embodiments of the invention. It will be understood that each block, and combinations of blocks in the block diagram, may be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagram block or blocks.

Thus, it is seen that an apparatus, system and method to obtain visual content via a telephony voice call is provided. One skilled in the art will appreciate that the present invention may be practiced by other than the above-described embodiments, which are presented in this description for purposes of illustration and not of limitation. The specification and drawing are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations.

For the purposes of interpreting words used in the claims, it is to be noticed that the term "comprising", should not be interpreted as being limitative to the claim elements listed thereafter. Thus, the scope of the expression "a device comprising elements A and B" should not be limited to devices consisting only of components A and B. It means that with respect to the present invention, the only relevant components of the device are A and B. That is, the terms "including", "comprising" and variations thereof mean "including but not limited to", unless expressly specified otherwise. The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

What is claimed is:

1. A method implemented using a processor, the method comprising the steps of:
   detecting at least one telephony attribute associated with a voice call directed from a voice communication device to a publicly switched telephone network number, where the step of detecting the telephony attribute occurs outside to the voice communication device, and where the at least one telephony attribute is selected from a group consisting of:
   a telephone number, a number associated with a voice communication device, a voice network identifier, an area code, a country code, an initiation of a voice call, a connection of a voice call, a disconnection of a voice call, a termination of a voice call, a detection of a Public-Switched Telephone Network signal, a detection of a Voice over Internet Protocol signal, a detection of a Interactive Voice Response signal, a detection of a Dual Tone Multi-Frequency signal, a geographic location identifier, a street address, a zip code, a postal code, an account identifier associated with a subscriber, and a combination of two or more thereof;
   identifying a visual content that has been preassociated with the at least one telephony attribute;
   initiating a request for the visual content in response to the detecting step; and
   receiving the visual content in response to the initiating step, the visual content being received at a display device.

2. The method of claim 1, where the step of identifying a visual content comprises querying an index stored at a publicly switched telephone network interface and identifying a visual content associated with the at least one telephony attribute.

3. The method of claim 1, where the step of identifying the visual content comprises querying an index stored at a publicly switched telephone network interface and identifying an interactive display associated with the telephony attributes.

4. The method of claim 1, where the voice communication device comprises a device structured to communicate with the public switched telephone network.

5. The method of claim 1, where the step of initiating the request for the visual content comprises querying a content subsystem containing visual content associated with the telephony attributes.

6. The method of claim 1, where the visual content is selected from the group consisting of: a static visual content, a dynamic visual content, an interactive visual content, a menu, and a combination of two or more thereof.

7. The method of claim 1, where the display device is structured to communicate with an Internet.

8. The method of claim 1, where the publicly switched telephone network number is a toll-free number.

9. The method of claim 1, where the voice communication device is also the display device.

10. The method of claim 1, where the display device is a multi-party video display.

11. A method implemented using a processor, the method comprising the steps of:
    detecting at least one telephony attribute associated with a voice call directed from a voice communication device to a publicly switched telephone network number, where the at least one telephony attribute is selected from a group consisting of:
    a telephone number, a number associated with a voice communication device, a voice network identifier, an area code, a country code, an initiation of a voice call, a connection of a voice call, a disconnection of a voice call, a termination of a voice call, a detection of a Public-Switched Telephone Network signal, a detection of a Voice over Internet Protocol signal, a detection of a Interactive Voice Response signal, a detection of a Dual Tone Multi-Frequency signal, a geographic location identifier, a street address, a zip code, a postal code, an account identifier associated with a subscriber, and a combination of two or more thereof;
    identifying at least one participant associated with the at least one telephony attribute;
    initiating a request for the at least one participant to access a multi-party video display; and
    providing access to the multi-party video display to the at least one participant.

12. The method of claim 11, where the publicly switched telephone network number is a toll-free number.

13. The method of claim 11, where a voice from the voice call and the multi-party video display are placed into a multiparty video conference.

14. The method of claim 11, where a voice from the voice call and the multi-party video display are joined into a multiparty video conference and a visual content displayed on the multi-party video display is viewable to a plurality of other callers.

15. A system comprising:
- a detection module configured to detect an initiation of a voice call from a voice communication device to a publicly switched telephone network number, where the detection module is located outside to the voice communication device;
- an identification module configured to identify a visual content preassociated with the telephone number; and
- an access module communicatively coupled to the detection module and configured to send a request for the identified visual content to a content subsystem and receive the identified visual content from the content subsystem in response to the request;
- where the access module sends the identified visual content to a display device.

16. The system of claim 15, where the publicly switched telephone network number is a toll-free number.

17. The system of claim 15, where the display device is a multi-party video display.

18. The method of claim 15, where the voice communication device is also the display device.

\* \* \* \* \*